United States Patent [19]

Morita

[11] Patent Number: 4,990,077
[45] Date of Patent: Feb. 5, 1991

[54] INJECTION MOLD

[75] Inventor: Kiyoo Morita, Kanagawa, Japan

[73] Assignee: Fuji Photo Film Co., Ltd., Minami-Ashigara, Japan

[21] Appl. No.: 444,232

[22] Filed: Dec. 1, 1989

[30] Foreign Application Priority Data

Dec. 2, 1988 [JP] Japan .................................. 63-304214

[51] Int. Cl.$^5$ ............................................. B29C 45/16
[52] U.S. Cl. ..................................... 425/130; 425/556; 425/577; 425/812
[58] Field of Search ............... 425/556, 577, 812, 130, 425/556, 577, 812

[56] References Cited

U.S. PATENT DOCUMENTS

| 2,217,661 | 10/1940 | Anderson | 425/506 |
| 2,227,966 | 1/1941 | Emsley | 425/556 |
| 4,125,246 | 11/1978 | Von Holdt | 425/556 |
| 4,374,636 | 2/1983 | Holmes | 425/812 |
| 4,552,328 | 11/1985 | Dutt et al. | 425/577 |

OTHER PUBLICATIONS

Pye, R. G. W., Injection Mould Design, Iliffe Books, London (1971), pp. 101, 102, 180 and 181.
Randolph et al., Plastics Engineering Handbook, Reinhold, N.Y. (1966) pp. 400, 401 and 402.

Primary Examiner—Willard E. Hoag
Attorney, Agent, or Firm—Sughrue, Mion, Zinn, Macpeak & Seas

[57] ABSTRACT

An injection mold which eliminates defects in the appearance of the molded product such as flow marks formed during the molding operation on those portions of the molded product adjacent molten resin injection gates. A fixed and a movable mold member are provided. An injection port for injecting molten resin into the mold cavity formed by the mold members is formed in the fixed mold member, while an opening communicating the mold cavity with the exterior is formed in the movable mold member at a position opposed to the injection port and spaced therefrom across the mold cavity. An insert member is inserted in the opening having a surface forming part of an inner surface of the mold cavity. The insert member has a size and shape such that gas in the mold cavity is discharged exteriorly from the mold via a fitting gap between said opening and the insert member.

1 Claim, 3 Drawing Sheets

INJECTION MOLD

BACKGROUND OF THE INVENTION

The present invention relates generally to an injection mold for forming a molded product of a synthetic resin and more particularly to such an injection mold which eliminates defects in the appearance of the molded product such as flow marks formed on those portions of the molded product which are disposed adjacent to the gates of the injection mold during the molding operation.

A audio or video magnetic tape cassette generally is formed of a case body composed of upper and lower cassette halves and a pair of hubs around which a magnetic tape is wound rotatably housed in the case body.

Generally, the upper and lower cassette halves are injection molded of a plastics material. More specifically a molten material is injected into a mold cavity via a gate, such as a direct gate and a submarine gate, so as to mold each cassette half, the cavity being formed by two mold members and corresponding in shape to the cassette half. The molding material filled in the cavity is cooled and is set or solidified to form the molded cassette half. This molded cassette half is removed from the mold, and thereafter for the purpose of achieving a desired design effect, a paper sheet or the like of a predetermined design is bonded to the outer surface of the cassette half. Alternatively a predetermined design can be printed directly on the cassette half.

The upper and lower cassette halves are commonly formed entirely of a light-transmitting material so that the winding condition of the magnetic tape can be readily observed from the exterior. Alternatively, as is the case of an audio compact cassette as shown in FIG. 4, window portions 6a and 6b of a transparent or a translucent nature are provided on a cassette half body 2a. The window portions 6a and 6b are formed in predetermined respective shapes for the purpose of achieving a desired design effect for the case body 1 and for other purposes.

Conventionally the window portions 6a and 6b are formed by bonding window members (made separately from the cassette half body 2) to the cassette half body 2 by an adhesive, ultrasonic welding or the like. In this case, however, since the step of shaping the window members and the bonding step are required, the design is limited and the productivity in manufacturing the cassette is not high. For these reasons, recently, a two-color molding method has been extensively used.

At present, the method which is most commonly used for two-color molding cassette halves is what is termed the "core back" method.

The process of manufacturing a cassette half by the core back method will now be described with reference to FIGS. 5 and 6.

Each of FIGS. 5 and 6 is a cross-sectional view of a cassette-half forming mold taken along a dot-and-dash line A—A in FIG. 4 showing an audio compact cassette.

As shown in FIG. 5, the injection mold for the core back method is composed of a fixed mold member 30, a movable mold member 31, and slide cores 33 and 34. A mold cavity 35 for molding the cassette half 3a, 3b is formed between the opposed surfaces of the fixed mold member 30 and the movable mold member 31. The slide cores 33 and 34 are movably received in the mold cavity 35 so as to form the window portions 6a and 6b.

A submarine gate 36 communicates with the mold cavity 35 so as to inject an opaque resin thereinto, and also direct gates 39 and 40 communicate with the mold cavity 35 so as to inject a transparent resin thereinto.

The fixed mold member 30 and the movable mold member 31 are mated with each other, and then the slide cores 33 and 34 are held against the inner surface of the fixed mold member 30 by a hydraulic drive device (not shown). In this condition, the opaque resin is injected into the mold cavity 35 through the submarine gate 36 to thereby injection-mold the cassette half body 2a. Thereafter as shown in FIG. 5, the slide cores 33 and 34 are suitably retracted to provide window-forming cavities 37 and 38. Then, the transparent resin is injected into the window-forming cavities 37 and 38 through the direct gates 39 and 40 which are provided in registry with the cavities 37 and 38, respectively thereby forming the transparent window portions 6a and 6b. The cassette half body 2a and the window portions 6a and 6b are fused together and formed into a unitary molded construction by the heat generated during the injection molding and by the injection pressure.

When the molten resin is injected into the mold cavity particularly through the direct gates 39 and 40 so as to form the window portions 6a and 6b, a shearing heat develops at the distal end of the direct gate. This shearing heat decomposes part of the injection resin to produce gas or causes refuse of the resin to deposit on the distal end portion of the direct gate 39, 40. As a result, turbulence develops in the flow of the resin so that appearance defects such as flow marks, are formed on those portions 41 of the molded product disposed adjacent the direct gates. Moreover unlike the submarine gate, in many cases the direct gates are unavoidably disposed in such positions as to form the outer surface portions of the case body, such as the window portions 6a and 6b, and therefore the such appearance defects markedly adversely affect the appearance of the cassette.

SUMMARY OF THE INVENTION

It is therefore an object of this invention to overcome the above deficiencies and to provide an injection mold which eliminates defects in appearance of the molded product such as flow marks formed on those portions of the molded product adjacent to the gates during the molding operation.

The above and other objects of the present invention are achieved by an injection mold comprising at least two mold members, and an injection port for injecting an injection material into a mold cavity formed by the mold members, characterized in that degassing means is provided at an portion of mold which is disposed in opposed relation to the injection port and is spaced from the injection port by the mold cavity. The degassing means is composed of an opening communicating the mold cavity with the exterior of the mold, and an insert member inserted in the opening and forming part of the surface of the mold cavity. The gas in the mold cavity is discharged exteriorly from the mold via a fitting gap formed by the fitting of the insert member in the opening.

With this construction, the gas produced as a result of the decomposition of part of the injection resin (which is injected from the injection port) by the shearing heat developed at the distal end of the injection port flows through the fitting gap between the insert member and the opening and is discharged from the mold via the opening without disturbing the flow of the injection resin.

DESCRIPTION OF THE PREFERRED EMBODIMENTS

Preferred embodiments of an injection mold of the present invention will now be described in detail.

Figure 1:
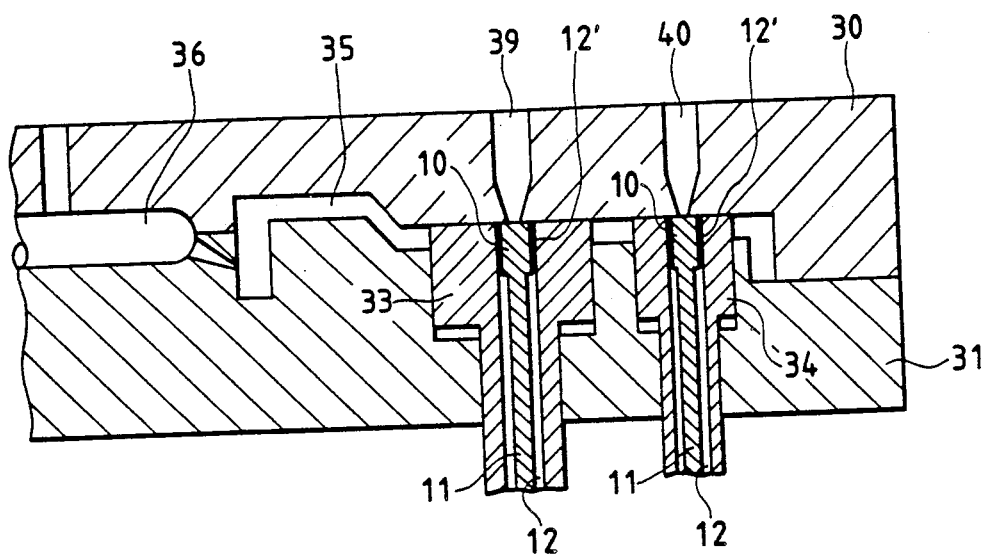
FIGS. 1 and 2 are a cross-sectional view of a mold for molding a cassette half of a magnetic tape cassette provided in accordance with a preferred embodiment of the present invention.
Figure 2:
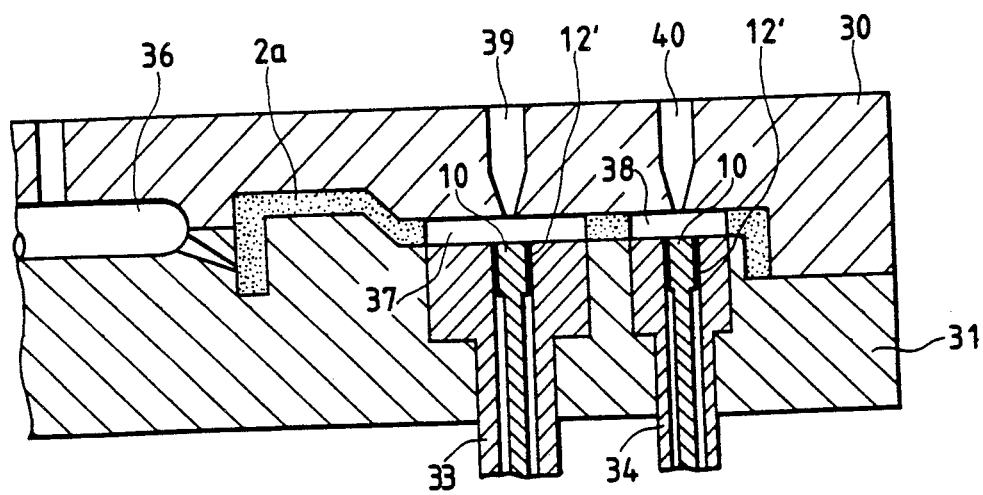
Figure 4:
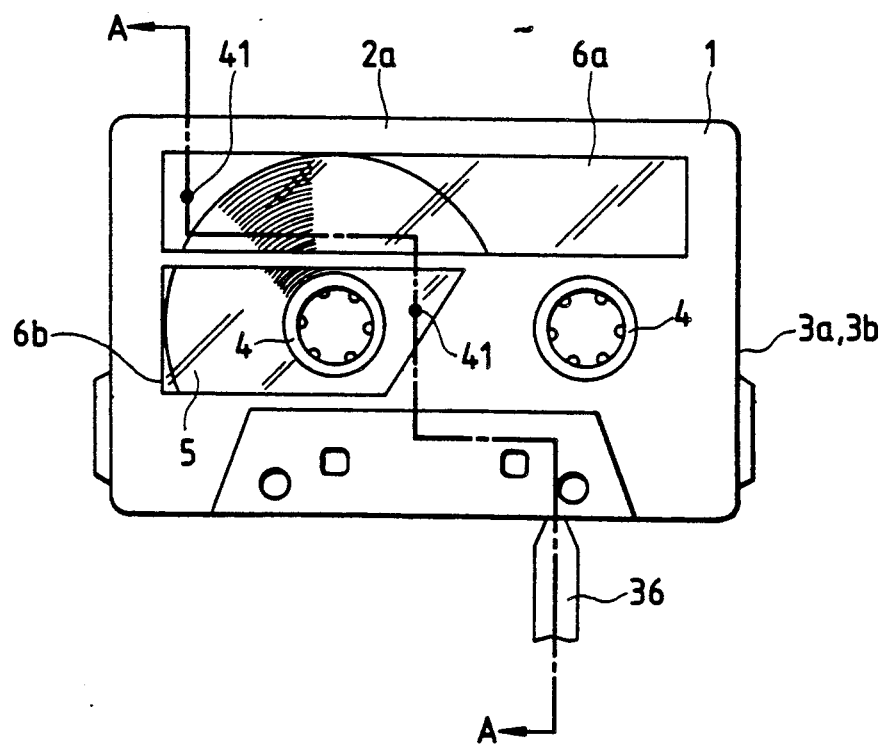
FIG. 4 is a plan view of a conventional magnetic tape cassette.
Figure 5:
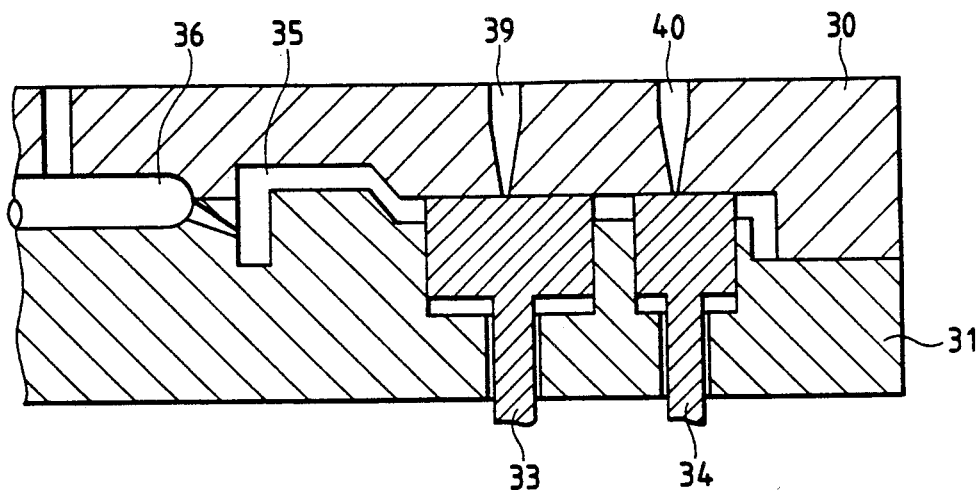
FIGS. 5 and 6 are a cross-sectional view of a conventional mold for molding a cassette half of a magnetic tape cassette.
Figure 6:
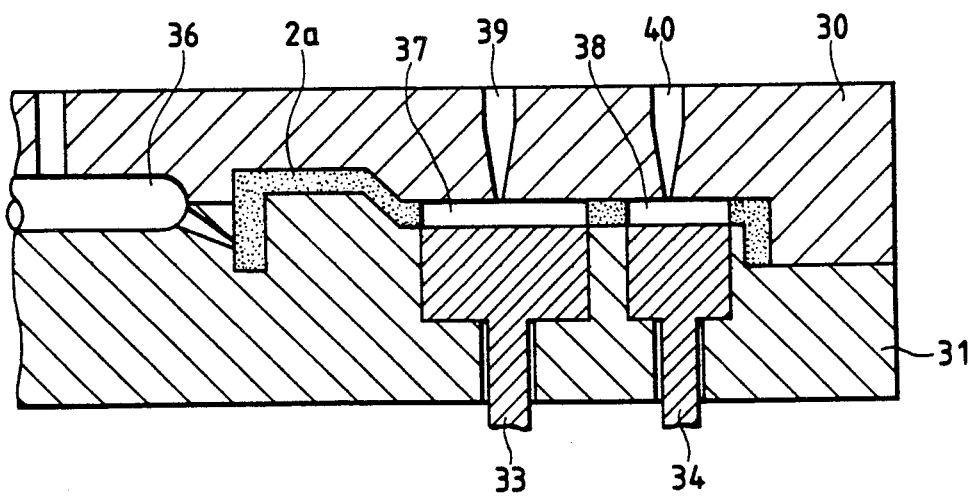

Each of FIGS. 1 and 2 is a cross-sectional view of an injection mold of the present invention for forming a cassette half of a magnetic tape cassette. The magnetic tape cassette is generally similar to the conventional magnetic tape cassette shown in FIG. 4. The magnetic tape cassette includes a case body 1 composed of upper and lower cassette halves 3a and 3b. and a pair of hubs 4 on which a magnetic tape 5 is wound rotatably housed within the case body 1. The case body 1 is made of a plastic resin, as is the case with the conventional case body.

A cassette half body 2a is two-color molded by the core back method, and window portions 6a and 6b are formed of resin of one color, whereas the cassette half body 2a other than these window portions is molded of a resin of another color.

As shown in FIG. 1, the injection mold is composed of a fixed mold member 30 a movable mold member 31 and slide cores 33 and 34. A mold cavity 35 for molding the cassette half 3a, 3b is formed between the opposed surfaces of the fixed mold member 30 and the movable mold member 31. The slide cores 33 and 34 are movably received in the mold cavity 35 so as to form the window portions 6a and 6b.

A submarine gate 36 communicates with the mold cavity 35 so as to permit injection of an opaque resin thereinto, and also direct gates 39 and 40 communicate with the mold cavity 35 so as to permit injection of a transparent resin thereinto.

Cylindrical openings 12 and 12 formed in the slide cores 33 and 34, respectively, are disposed in opposed relation to the injection ports of the direct ports 39 and 40, respectively. An ejector pin 11 is inserted in each of these two openings 12 and 12. Each ejector pin 11 has a cylindrical distal end portion 10 disposed close to the mold cavity 35, and a small gap 12' is formed in the radial direction between the peripheral surface of the distal end portion 10 and the inner peripheral surface of the opening 12. Although the size of this small gap 12', is suitably determined depending on the pressure of the injection resin to be injected from the direct gates 39 and 40 and the composition of the injection resin, it is preferred that the size of the small gap 12' not be more than 0.1 mm in order to avoid adverse effects on the molded product. Each opening 12 communicates with the exterior of the movable mold member 31.

The fixed mold member 30 and the movable mold member 31 are mated with each other and then the slide cores 33 and 34 are held against the inner surface of the fixed mold member 30 by a hydraulic drive unit (not shown). In this condition the opaque resin is injected into the mold cavity 35 through the submarine gate 36 to injection mold the cassette half body 2a.

Thereafter, as shown in FIG. 2, the slide cores 33 and 34 are suitably retracted to provide window forming cavities 37 and 38. Then, the transparent resin is injected into the window-forming cavities 37 and 38 through the direct gates 39 and 40 which are provided in registry with these cavities 37 and 38, respectively, thereby forming the transparent window portions 6a and 6b. The cassette half body 2a and the window portions 6a and 6b are fused together and formed into a unitary molded construction by the heat generated during the injection molding process and by the injection pressure. During the above operation, each ejector pin 11 is moved together with its mating slide core 33, 34 in such a manner that the outer end face of the distal end portion 10 of the ejector pin 11 is maintained flush with the distal end face of the slide core 33, 34 which defines part of the surface for forming the window-forming cavity 37, 38.

Then, when the injected resin filled in the mold cavity is cooled and set, the movable mold member 31 is opened and the molded cassette half is removed from the mold. At this time, the ejector pins 11 eject the molded cassette half toward the fixed molded member 30, thus facilitating the removal of the molded cassette half.

Thus, in this embodiment gas produced as a result of decomposition of part of the injection resin (which is injected from the direct gates 39 and 40) by the shearing heat flows through the small gaps 12' formed between the distal end portions 10 of the ejector pins 11 (which are disposed in opposed relation to the direct gate 39, 40) and the inner peripheral surface of its mating openings 12, and the gas is discharged from the mold via the opening 12. Thus, these small gaps 12' and the openings 12 serve as degassing means.

Each of the above small gaps 12' is suitably formed as a fitting gap of an annular shape, and therefore the injection resin does not flow into the small gaps 12', and only the gas can pass through these small gaps 12'.

Thus, the gas is discharged from the mold via the fitting gap between the ejector pins 11 and the inner peripheral surface of the openings 12, without imparting a turbulence to the flow of the injection resin injected into the mold cavity. Therefore, the molded product is free from appearance defects caused by flow turbulence of the injected resin, such as flow marks formed on those portions of the molded product adjacent the direct gates.

In the above embodiment, although the degassing means, provided at those portions of the mold disposed in opposed relation to the injection ports for injecting the molten resin, is constituted by the ejector pins 11 and the openings 12 formed in the slide cores 33 and 34, the degassing means is not limited to such arrangement.

Another preferred embodiment of the invention incorporating another form of degassing means will now be described.

Figure 3:
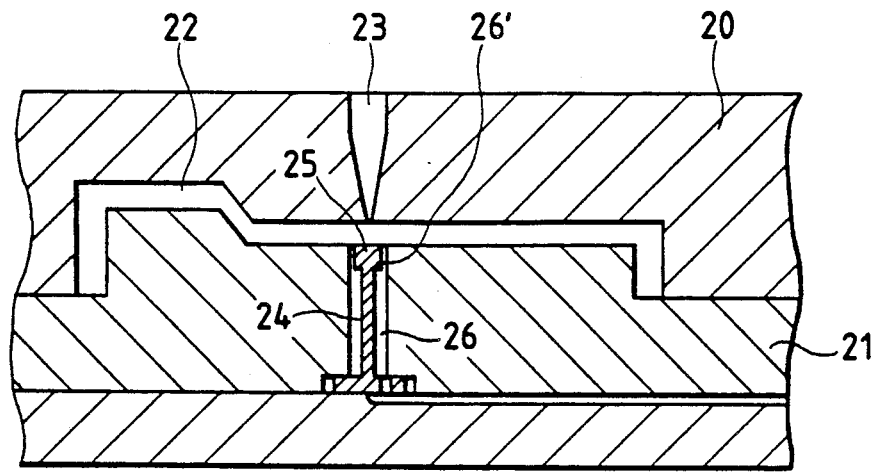
FIG. 3 is a cross-sectional view of a mold for molding a cassette half of a magnetic tape cassette provided in accordance with another preferred embodiment of the present invention.

FIG. 3 is a cross-sectional view of a portion of an injection mold for single-color molding a cassette half of an audio compact cassette.

The injection mold includes a fixed mold member 20 and a movable mold member 21 which cooperate to form a mold cavity 22 for molding the cassette half. The mold cavity 22 is in communication with a direct gate 23 formed in the fixed mold member 20.

A cylindrical opening 26 is formed in a portion of the movable mold member 21 disposed in opposed relation to the direct gate 23, and an insert member 24 is inserted in the opening 26. The opening 26 cooperates with the insert member 24 to provide degassing means. The opening 26 communicates the mold cavity 22 with the exterior of the mold. The insert member 24 has a cylindrical distal end portion 25 disposed close to the mold cavity 22, and a small gap 26' is formed in the radial direction between the peripheral surface of the distal end portion 25 and the inner peripheral surface of the opening 26. It is preferred that the size of the small gap 26' be not more than 0.1 mm, the same as in the case of the preceding embodiment.

Gas produced as a result of decomposition of part of the injected resin by shearing heat when the molten resin is injected from the direct gate 23 into the mold cavity 22 flows through the small gap 26' formed between the distal end portion 25 of the insert member 24 (which is disposed in opposed relation to the direct gate 23) and the inner peripheral surface of the opening 26, and is discharged from the mold via the opening 26. Thus, the small gap 26' and the opening 26 serve as degassing means.

Thus, the degassing means is constituted by the openings 26 and the insert member 24, besides the fitting gap formed between the opening 26 and the insert member 24 fitted therein. Therefore, only the gas is discharged from the mold, without leakage of the injected resin.

Although the above embodiments are directed to molds for molding the cassette halves of a magnetic tape cassette, the invention is not limited to such an application and is applicable to various injection molds of the general type in which molten material is injected from an injection port into a mold cavity to form a molded product. The size and shape of the opening formed in that mold member disposed in opposed relation to the injection port the shape of the insert member inserted in the opening and other parameters can be suitably selected depending on the particular injection molding application.

As described above, in the injection molds provided according to the present invention, degassing means is provided at the injection port-facing portion of the mold disposed in opposed relation to the injection port for injecting the resin and is spaced from the injection port by the mold cavity. The degassing means comprises the opening communicating the mold cavity with the exterior of the mold, and the insert member inserted in the opening and forming part of the surface of the mold cavity. The gas in the mold cavity is discharged exteriorly from the mold via the fitting gap formed by the fitting of the insert member in the opening.

The gas produced as a result of decomposition of part of the injected resin (which is injected from the injection port) by the shearing heat developed at the distal end of the injection port, flows through the fitting gap between the insert member and the opening and is discharged from the mold via the opening 12 without disturbing the flow of the injected resin. By suitably determining the size of the fitting gap, the injected resin does not leak, and only the gas is discharged.

Thus, turbulence of the flow of the injected resin due to the gas can be prevented, and therefore there appearance defects caused by such flow turbulence, such as flow marks formed on those portions disposed adjacent to the direct gates, are avoided.

Further, since the gas produced as a result of decomposition of part of the injected resin by shearing heat developed at the distal end of the injection port is discharged by the degassing means, the injection speed, and hence production rate, can be increased by increasing the injection pressure of the injection resin, thereby enhancing the productivity of the molded products.

What is claimed is:

1. An injection mold for molding a cassette half body for a magnetic tape cassette, comprising: a fixed mold member and a movable mold member, a molding cavity being defined by said fixed and movable mold members having a shape of said cassette half body; a pair of slide cores slidably disposed in corresponding openings in said movable mold member, said slide cores being slidably insertable into and out of said molding cavity, a pair of injector pins, each of said injector pins being slidably received in a cylindrical opening in a corresponding one of said slide cores with a fitting gap therebetween of not more than 0.1 mm to allow the discharge of gas therethrough, a submarine gate being formed between said fixed and movable mold members for injecting an opaque resin into said molding cavity when said slide cores and injector pins are inserted into said molding cavity to thereby mold opaque portions of said half body, and direct gates being formed in said fixed mold member opposite each of said slide cores for injecting a transparent resin into spaces vacated by withdrawing said slide cores and injector pins from said molding cavity after injection of said opaque resin through said submarine gate to thereby mold transparent window portions of said half body, wherein gas formed during injection of said transparent resin through said direct gates escapes around said ejector pins.

* * * * *